United States Patent [19]
Kotake

[11] Patent Number: 5,984,266
[45] Date of Patent: Nov. 16, 1999

[54] COUPLING FOR A SPRAY APPARATUS

[75] Inventor: Naoyuki Kotake, Tokyo, Japan

[73] Assignee: Nitto Kohki Co., Ltd., Tokyo, Japan

[21] Appl. No.: 09/021,836

[22] Filed: Feb. 11, 1998

[30]    Foreign Application Priority Data

Feb. 13, 1997  [JP]   Japan .................................. 9-042866

[51] Int. Cl.⁶ ................................................ F16L 29/00
[52] U.S. Cl. ...................................... 251/149.1; 285/316
[58] Field of Search .............................. 251/149.1, 149.6, 251/143; 285/316

[56]              References Cited

U.S. PATENT DOCUMENTS

| | | | |
|---|---|---|---|
| 3,884,256 | 5/1975 | Corlet ................................ | 251/149.1 X |
| 4,344,455 | 8/1982 | Norton et al. ................... | 251/149.6 X |
| 5,064,416 | 11/1991 | Newgard et al. ................ | 251/149.1 X |
| 5,697,410 | 12/1997 | Rutter et al. ...................... | 251/149.6 X |

FOREIGN PATENT DOCUMENTS 8-323308  12/1996  Japan .

Primary Examiner—Kevin Lee
Attorney, Agent, or Firm—Fulbright & Jaworski L.L.P.

[57]              ABSTRACT

A coupling disposed in a pneumatic hammer and for removably connecting a spray can to a plug body for connecting a fluid conduit is provided. The coupling is provided with a socket body having a first end portion, a second end portion and an axial hole open in the first and second end portions, a locking mechanism provided in the first end portion end of the socket body and releasably locking and engaging with the plug body, and a mounting member attached to the second end portion of the socket body in such a manner as to freely slide to an axial direction. The mounting member attaches the socket body to the spray can in a removable manner. Further, the coupling is provided with a pressing portion axially projecting from the second end portion of the socket body, the pressing portion being brought into contact with the front end portion of the nozzle when the spray can is axially pressed toward the second end portion of the socket body, thereby pressing the nozzle to the container portion end of the spray can.

12 Claims, 4 Drawing Sheets

COUPLING FOR A SPRAY APPARATUS

BACKGROUND OF THE INVENTION

The present invention relates to a coupling for connecting a spray apparatus capable of discharging and/or replenishing a fluid by pressing a nozzle projecting from an end portion of the spray apparatus, to a fluidic apparatus, and more particularly to a coupling capable of performing a discharging operation and an replenishing operation of the spray apparatus in a state of connecting the spray apparatus with the fluidic apparatus, such as a pneumatic tool.

As shown in FIG. 7, conventionally, when a fluid (for example, a washing agent, a lubricating agent, an anticorrosive agent and the like) is injected into an pneumatic tool 19 powered by a compressed air from a spray can by pressing a nozzle 181 projecting at a spray end portion 180, a resin cap 182 provided on the spray can 18 is interposed between the spray can 18 and the tool 19.

The cap 182 is structured such that a recess portion 183 to which the spray end portion 180 of the spray can 18 is inserted is formed in a top plate, that a lock hook 188 adhering the spray can 18 is provided in three portions of a peripheral surface of the recess portion 183, that a through hole 184 to which the nozzle 181 is inserted is provided in a center portion of the recess portion 183, that a cylinder portion 185 having a diameter smaller than an inner diameter of a plug body 190 provided in the air tool 19 is provided in a projecting manner, that a holding cylinder portion 186 engageable with the plug body 190 is provided in a projecting manner, and that an inward flange portion 187 having an opening diameter larger than an opening diameter of the nozzle 181 is formed in a front end of the cylinder portion 185. In this case, a center portion of a surface of the recess portion 183 is formed in a taper shape so as to easily insert the nozzle 181 into the through hole 184.

In a use method, at first, a plug body 190 of the air tool 19 is fitted into the holding cylinder portion 186 of the cap 182 so that the air tool 19 and the cap 182 are connected to each other. Next, the nozzle 181 of the spray can 18 is inserted into the through hole 184 open to the center of the recess portion 183 of the cap 182, so that the front end portion of the nozzle 181 is brought into contact with the flange portion 187 provided in the front end of the cylinder portion 185. Further, as well as in this state, the spray can 18 is pressed and the lock hook 188 is brought into contact with the spray end portion 180, the flange portion 187 presses the nozzle 181 so as to open a valve normally set in a closed state and disposed therewithin and the fluid is discharged from the front end of the nozzle 181 in a state that the spray can 18 is in an inserted state, so that the fluid is injected into the air tool 19.

However, in accordance with the conventional spray can method, there is a problem mentioned below. Accordingly, when the nozzle 181 is inserted into the through hole 184 of the cylinder portion 185 formed in the cap 182, there is a case that the nozzle 181 is erroneously pressed and the fluid is carelessly discharged out, and further, since the cylinder portion 185 and the front end portion of the plug body 190, and the holding cylinder portion 186 and the plug body 190 are respectively in contact with each other in a fitting manner, a sealing performance is deteriorated and there is a risk that a fluid leaks from these portions.

Further, since the spray can 18 and the cap 182 are attached to each other in a fitting manner by the lock hooks 188 at a time of inserting the spray can 18 into the cap 182, the fluid is kept in an injecting state from the nozzle 181, so that in the case of stopping the injection of the fluid, it is necessary to remove the spray can 18 from the cap 182 each time, and further, there is a problem that the fluid is carelessly leaked out from the body of the air tool 19 by a backward flow.

Still further, there is a problem that in the case that an air intake port and an air exhaust port of the air tool 19 are provided in the same surface, the cap 182 can not be connected to the plug body 190.

BRIEF SUMMARY OF THE INVENTION

The present invention is intended to solve the problems mentioned above, and an object of the present invention is to provide a coupling having a good sealing performance between a plug body and a nozzle and capable of accurately and securely performing a fluid injection operation in a spray apparatus.

In order to achieve the object, in accordance with the present invention, there is provided a coupling for detachably connecting a plug body, being provided on a fluidic apparatus in order to connect the fluidic apparatus to a fluid tube, and having an outer peripheral groove and an axial hole, with a spray apparatus which includes a container portion for receiving a fluid, a nozzle having a front end portion projecting from the container portion and being urged toward the front end portion, a valve normally disposed closed position and disposed in an open position for opening an inner portion of the container portion to an outer environment through the nozzle when the nozzle is pressed to the container portion, and a spray end portion projecting from the container portion adjacent the nozzle, comprising a socket body having a first end portion, a second end portion and an axial hole open in the first and second end portions, a releasable locking mechanism provided in the first end portion end of the socket body, lockingly engaging through the groove of the plug body and communicating the axial hole in the socket body with the axial hole in the plug body, and a mounting member attached to the second end portion of the socket body in such a manner as to freely slide to an axial direction, the mounting member having a front end portion which projects to the axial direction from the second end portion of the socket body and engages with the spray end portion of the spray apparatus so as to attach the socket body to the spray apparatus in a removable manner, and a pressing portion axially projecting from the second end portion of the socket body, the pressing portion being brought into contact with the front end portion of the nozzle when the spray apparatus is axially pressed toward the second end portion of the socket body, thereby pressing the nozzle to the container portion end of the spray apparatus.

In the coupling described above, the socket body and the plug body are connected to each other by engaging the locking mechanism provided in the first end portion of the socket body with the outer periphery groove of the plug body in a state of mounting the mounting member provided in the rear end portion of the socket body to the position near the nozzle of the spray apparatus. When the spray apparatus is pressed and the mounting member is moved with respect to the socket body, the pressing portion provided in the second end portion of the socket body presses the nozzle, so as to communicate the nozzle with the socket body. The fluid within the container portion is injected out through the nozzle pressed by the pressing portion, so that the fluid can be injected into the fluidic apparatus to which the plug body is connected through the socket body and the plug body. On the contrary, in the case that a pressure higher than the pressure within the spray apparatus is operated within the fluidic apparatus, the fluid can be injected into the container portion of the spray apparatus from the fluidic apparatus through the plug body and the socket body so as to fill up the container portion. Since the fluid injection is performed by connection between the socket body and the plug body, a leakage to the outer portion is prevented.

Accordingly, in accordance with the coupling of the present invention, the spray apparatus and the socket body, and the socket body and the plug body can be easily attached and detached, the operation can be smoothly performed, and the fluid can be discharged from the spray apparatus or injected to the spray apparatus in a state of connecting the spray apparatus, the socket body and the plug body. Further, the members can be securely connected between the respective members, a high sealing performance can be secured, and the operation can be safely performed with preventing the leakage.

In the case that a spring is attached to the second end portion of the socket body for urging the mounting member to the front end portion, when the pressing force acting on the spray apparatus is removed, the spray apparatus is separated from the socket body by the mounting member, so that the pressing force acting on the nozzle can be reliably removed.

In the case that the mounting member has at least one axially extending slit having substantially a cylindrical shape and capable of elastically changing a diameter of the front end portion and a locking projection portion projecting inward or outward in the radial direction from the front end portion so as to be locked in the spray end portion of the spray apparatus, the coupling can be held to the spray apparatus through the mounting member in a significantly simple manner.

It is preferable that the pressing portion is provided with an outlet and inlet port communicating with the axial hole and having a circular cone surface outward expanding a diameter, and the circular cone surface in the outlet and inlet port can be sealed and engaged with the front end portion of the nozzle in a fluid sealing manner.

In the case that the socket body has a guide portion axially projecting from the second end portion and axially guiding the mounting member, and a stopper formed in the front end portion of the guide portion and locking the mounting member urged by the spring, the mounting member can be smoothly moved within a predetermined range.

It is preferable that the stopper is disposed at a position in which the nozzle of the spray apparatus and the pressing portion are separated at a time of locking the mounting member urged by the spring.

It is advantageous to further comprise a seal member disposed within the socket body and sealing between the plug body and the socket body in a fluid sealing manner.

In the case that the socket body comprises a cylindrical portion at the first end portion thereof, and the locking mechanism has at least one long hole formed in the cylindrical portion, at least one locking member capable of moving in the radial direction of the cylindrical portion through the long hole, and an operation sleeve attached on the cylindrical portion in such a manner as to axially move and preventing the locking member from moving outward in the radial direction when the locking member moves inward in the radial direction, and the inner end portion of the locking member in the radial direction can be fitted into the outer peripheral groove of the plug body, the coupling can be mounted to and removed from the plug body in a significantly simple and secure manner.

In the case that the locking mechanism is attached on the cylindrical portion and has a lock ring preventing the operating sleeve from moving from a position preventing a movement of the locking member outward in the radial direction, the safety performance can be further improved.

It is preferable that the locking mechanism is provided with an inner sleeve slidably disposed within the cylindrical portion, and the inner sleeve is disposed at a position in which the inner end portion of the locking member in the radial direction is prevented from projecting within the cylindrical portion when the coupling is not attached to the plug body and can be moved from the position by the plug body.

It is preferable that the operating sleeve and the inner sleeve are urged toward the direction apart from the second end of the socket body.

In the case that the cylindrical portion is integrally formed with the socket body, a number of parts can be reduced.

Additional object and advantages of the invention will be set forth in the description which follows, and in part will be obvious from the description, or may be learned by practice of the invention. The object and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

A preferred embodiment in accordance with the present invention will be described below with reference to the accompanying drawings.

Figure 1:
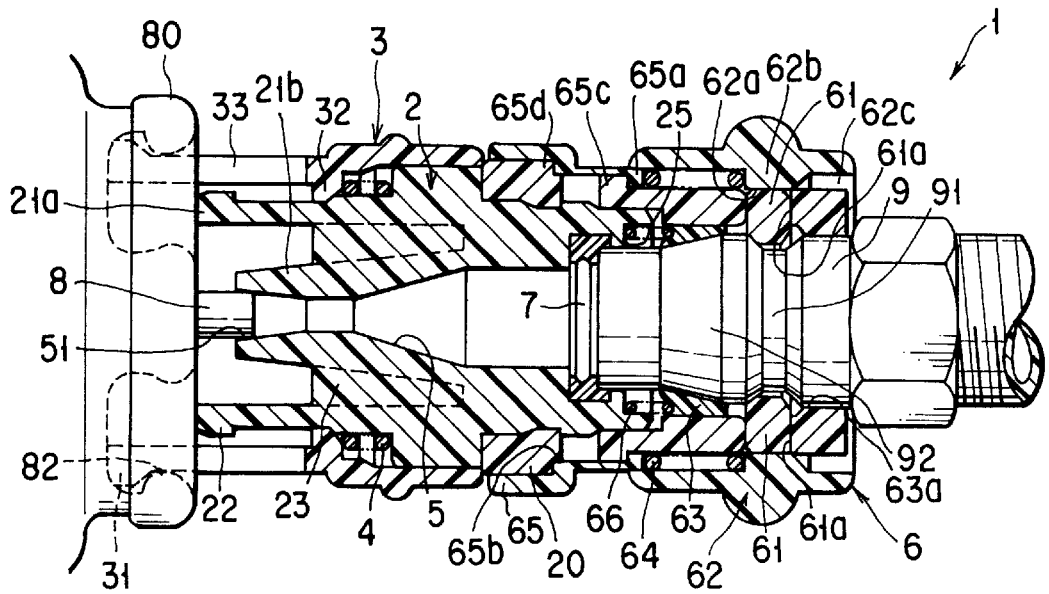
FIG. 1 is a longitudinal cross sectional view which shows a state of connecting a coupling in accordance with a preferred embodiment of the present invention and a spray apparatus and of pressing a nozzle.
Figure 2:
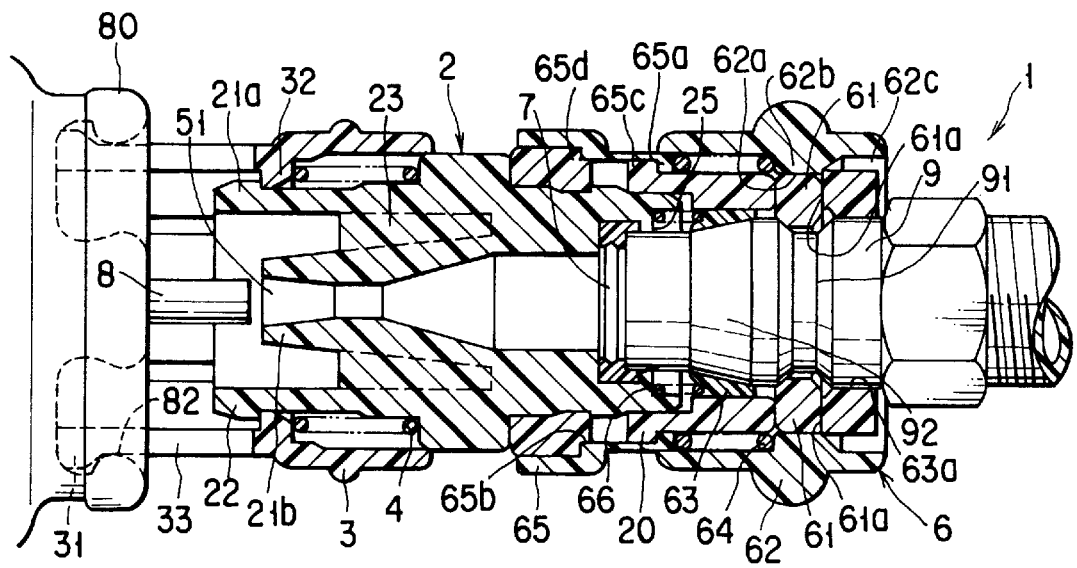
FIG. 2 is a longitudinal cross sectional view which shows a state of connecting the coupling shown in FIG. 1 and the spray apparatus.
Figure 3:
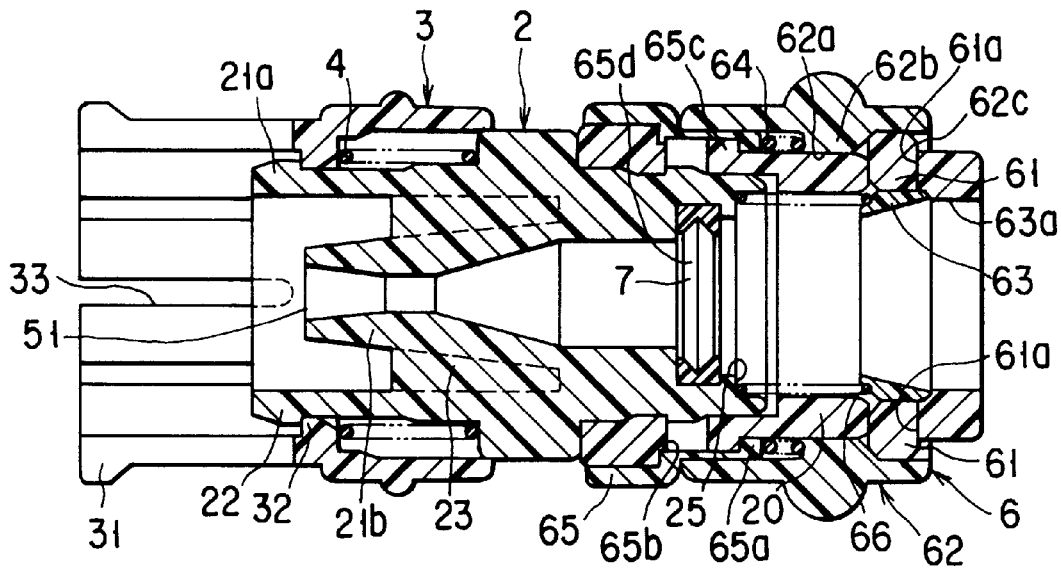
FIG. 3 is a longitudinal cross sectional view which shows a socket body and a mounting member of the coupling shown in FIG. 1.
Figure 4:
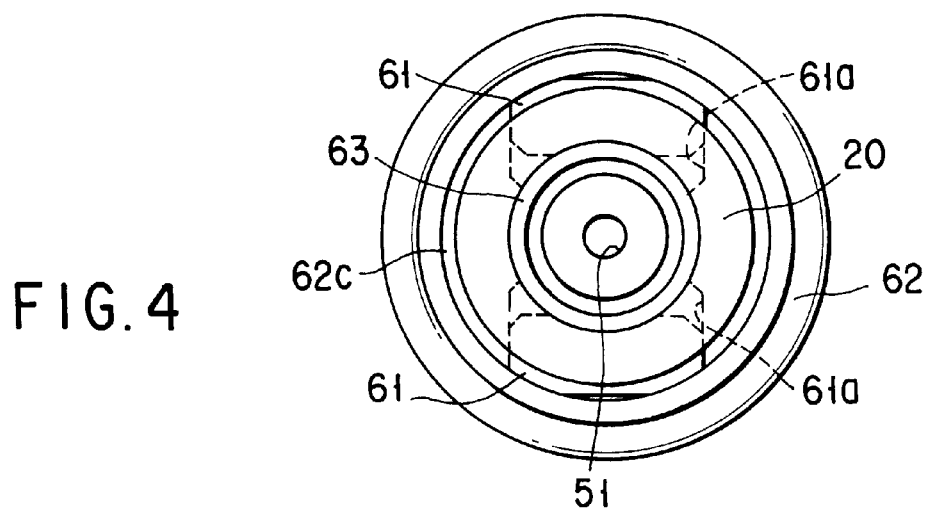
FIG. 4 is an end view which shows the socket body of the coupling shown in FIG. 1.
Figure 5:
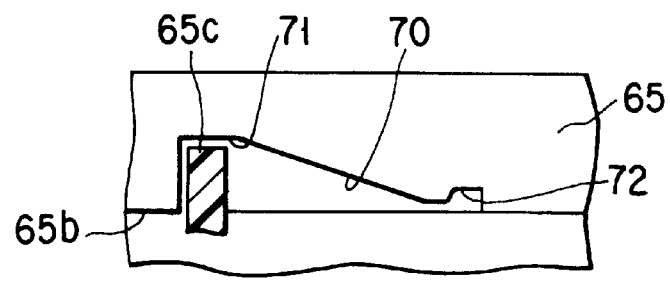
FIG. 5 is a schematic view which shows an inner surface of a lock ring in an exploded manner in order to show a relation between a cam groove formed on an inner surface of the lock ring used for the coupling in FIG. 1 and a projection formed on an outer periphery of a cylindrical portion.
Figure 6:
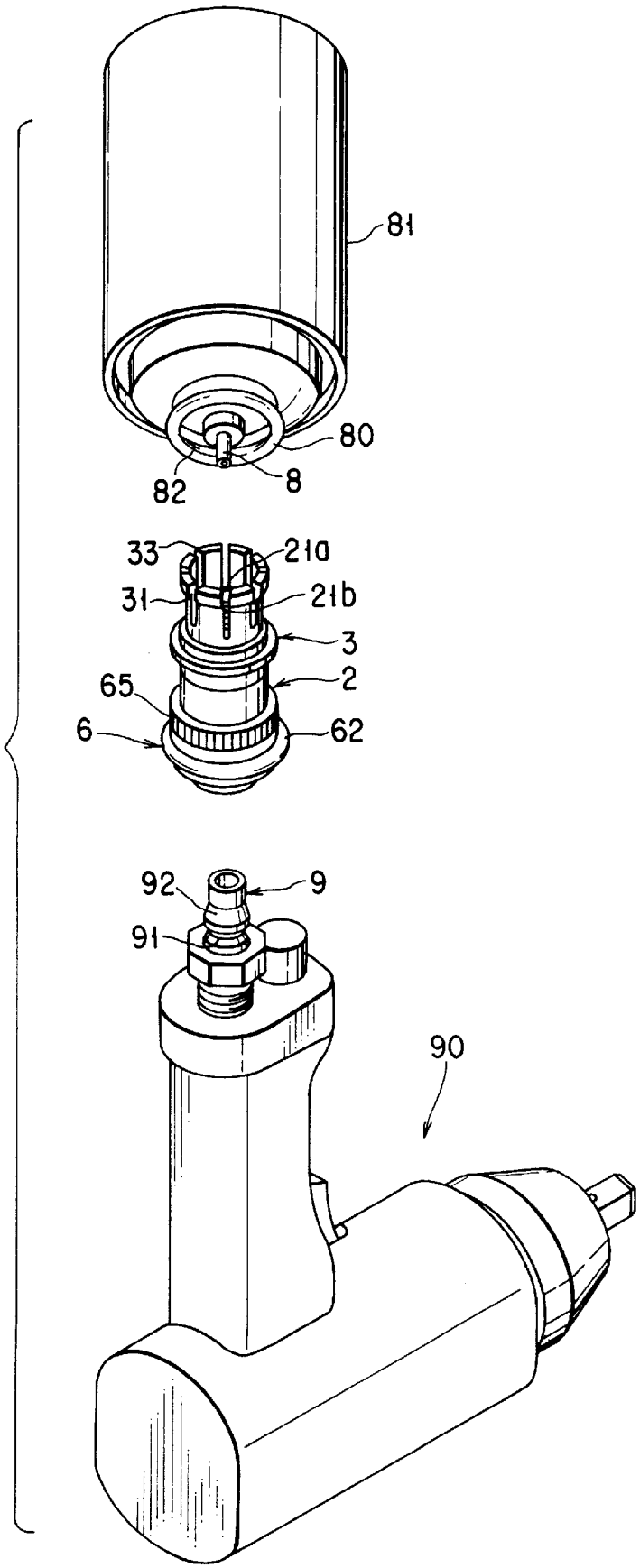
FIG. 6 is a perspective view which schematically explains a use method of the coupling.
Figure 7:
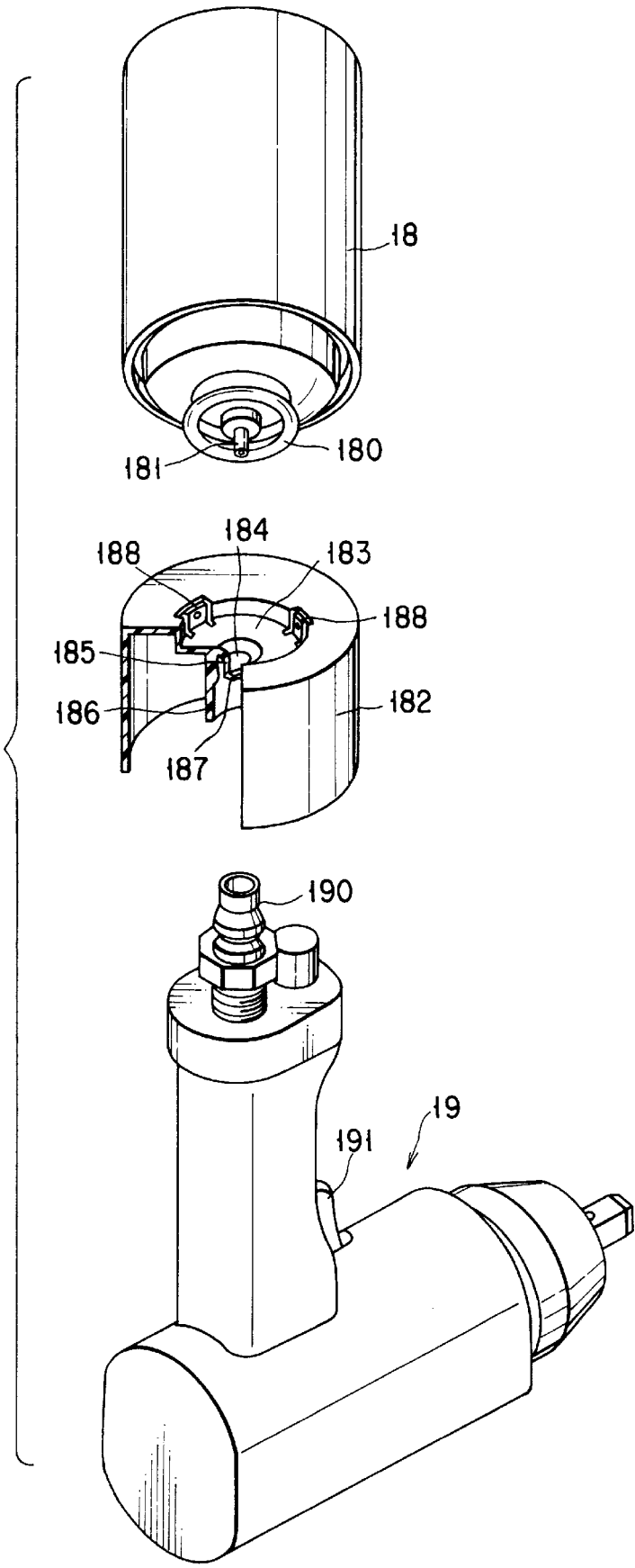
FIG. 7 is a perspective view which schematically shows a conventional embodiment.

FIGS. 1 to 3 are cross sectional views which show an embodiment of a coupling in accordance with the present invention, FIG. 4 is a side elevational view which shows the coupling shown in FIG. 1, FIG. 5 is an exploded view which shows a part of an inner surface of a lock ring and FIG. 6 is a perspective view which schematically shows a use example.

In the drawings, a coupling 1 in accordance with the present invention is structured such that a mounting member 3 having substantially a cylindrical shape and urged to a connecting end of a spray apparatus 81 (hereinafter, refer to a spray end) energized by a spring 4 is slidably provided in an outer periphery of a rear end portion of a socket body 2, and a stopper 22 locking the mounting member 3 is provided in the outer peripheral portion of the rear end portion in a projecting manner. Further, the rear end portion is formed as a double structure, and an outer cylindrical portion 21a having the stopper 22 and a taper-shaped pressing portion 21b pressing a nozzle 8 of the spray apparatus 81 are respectively formed in an outer end and an inner end thereof.

A front end surface of the pressing portion 21b is formed in such a manner as to be buried in the front end surface of the outer cylindrical portion 21a and is provided with a plurality of reinforcing ribs 23 in a radial manner in such a manner as to project from the outer peripheral surface. Further, an open diameter of an outlet and inlet portion 51 communicating with a fluid passage of the pressing portion 21b is formed so as to be larger than an outer diameter of the nozzle 8, and further the fluid passage near the outlet and inlet port 51 is formed in a taper-shape being gradually narrower from the outlet and inlet port 51, so that the front end portion of the nozzle 8 inserted into the pressing portion 21b is brought into contact with the taper surface.

The mounting member 3 is structured such that a locking projection portion 31 engaging with a spray end portion 80 positioned near the nozzle 8 is provided in an outer end portion of a front end close to a spray in a projecting manner, a guide projection portion 32 is provided in an inner peripheral surface of a middle portion in a projecting manner and some slits 33 are formed in a longitudinal direction closer to the spray than the guide projection portion 32. Then, as shown in FIG. 3, the guide projection portion 32 pressed by an elastic force due to a spring 4 disposed between the guide projection portion 32 and the socket body 2 is locked with the stopper 22 of the socket body and is at a standstill.

Since a plurality of slits 33 are provided in the front end portion close to the spray end of the mounting member 3 as in the above manner, an opening of a front end portion can be enlarged and decreased, so as to be fitted to the spray end portion 80. Further, a righting moment is operated on the enlarged and decreased front end portion, so as to securely hold the spray end portion 80. In this case, as shown in FIGS. 3 and 5, the slit 33 is normally formed along a longitudinal direction of the mounting member 3 in a linear shape, however, as far as the open diameter of the front end portion can be enlarged and decreased, the shape is not limited, for example, the shape can be formed in a spiral shape or the like.

On the contrary, a locking mechanism 6 engaging with an outer peripheral groove 91 provided in a plug body 9 is provided in a front end portion of the cylinder portion 20 formed in an inserting end of the plug body 9 (hereinafter, refer to a plug end) of the socket body 2, and further, an annular elastic member 7 sealing between the socket body 2 and the plug body 9 in a liquid-tight manner is provided inside the socket body 2. The annular elastic member 7 is made of a rubber (for example, a nitrile rubber, a fluoro rubber, a chloroprene rubber, an ethylene propylene rubber and the like), and a cross sectional shape of a ring is suitably selected among a circular shape, a rectangular shape, a V shape, an X shape, a recess shape and the like. Further, in the drawings, the socket body 2 and the cylindrical portion 20 are separately formed, however, they can be formed as an integral unit.

The locking mechanism 6 is constituted by locking members 61 and 61 engaging with the outer peripheral groove 91 of the plug body 9, an operating sleeve 62 restricting an outward motion of the locking members 61 and 61, and a spring 64 pressing the operating sleeve 62, and in accordance with this embodiment, an inner sleeve 63 is provided so as to connect in one touch manner and a lock ring 65 is provided so as to improve a safety performance.

The cylindrical portion 20 is structured such that long holes 61a and 61a receiving the locking members 61 and 61 along the radial direction in such a manner as to freely project and sink are pierced at a position corresponding to a diameter of the front end portion close to the plug and a step portion 63a bringing the inner sleeve pressed by the spring 66 into contact therewith is formed inside the open end portion close to the plug. Further, a locking portion 65d engaging with a locking step portion 65b provided in the inner peripheral surface of the lock ring 65 is formed on the outer peripheral surface of the rear end portion and two projections 65c and 65c disposed adjacent to the locking step portion 65b and locking the lock ring 65 are formed on the outer peripheral surface. The front end portion of the cylindrical portion 20 is formed in such a manner as to have a diameter larger than that of a restricting projection 62b of an operating sleeve 62 mentioned below, so that the operating sleeve 62 is prevented from coming out from the front end portion of the cylindrical portion 20.

The locking member 61 has in a bottom surface an inner peripheral surface recessed in a circular arc shape in such a manner as to be engaged with the outer peripheral groove 91 provided in the plug body 9 and to be brought into contact with the outer peripheral surface of the inner sleeve 63. The locking member 61 is formed in a circular arc shape so as to be received within an open portion 62c provided in the operating sleeve 62, and is inserted into the long hole 61a of the cylindrical portion 20 in such a manner as to freely project and sink.

The inner sleeve 63 is slidably provided within the cylindrical portion 20, and is formed in an inside taper shape having an inner diameter larger in the plug end than in the socket body 2 end. Then, an end of a spring 66 is fixed to the end portion close to the socket body 2 and the other end of the spring 66 is fixed to the step portion 25 formed within the socket body 2, so that the end portion close to the plug is brought into contact with the step portion 63a of the cylindrical portion 20 so as to be at a standstill, thereby restricting the locking member 61 from inward moving by closing the long hole 61a pierced in the cylindrical portion 20.

The operating sleeve 62 is structured such that a restricting surface 62a restricting the locking member 61 from outward moving is formed in a restricting projection portion 62b provided in an inner peripheral surface in a projecting manner, and an opening portion 62c restricting the locking member 61 from projecting is formed in the end close to the plug end in an adjacent manner. Further, it is slidably provided in the outer periphery of the front end portion of the cylindrical portion 20 through the spring 64.

The lock ring 65 is structured such that a restricting cylindrical portion 65a slidably disposed between the cylindrical portion 20 and the operating sleeve 62 is provided in the plug end in a projecting manner, and locking step portions 65b and 65b engaging with the engaging portion 65d of the cylindrical portion 20 are provided in the inner peripheral portion. Further, as shown in FIG. 5, cam grooves 70, 70, each comprising a deep groove 71 and a shallow groove 72 and adapted to be engaged with the projection 65c of the cylindrical portion 20 are formed on the inner peripheral surface at equal intervals. Then, it is structured such that the lock ring 65 can be moved to the plug end by the shallow grooves 72 of the cam grooves 70 and the projections 65c to lock the operating sleeve 62.

Further, the spring 64 is disposed between the restricting cylindrical portion 65a and the operating sleeve 62, the operating sleeve 62 is elastically urged to the plug end of the cylindrical portion 20, the restricting projection portion 62b of the operating sleeve 62 is brought into contact with the locking members 61 and 61 projecting to the opening portion 62c of the operating sleeve 62, and the operating sleeve 62 is at a standstill in the spray end of the cylindrical portion 20. At this time, the locking members 61 and 61 are restricted by the inner sleeve 63 in an inward movement, and are restricted by the inner peripheral surface of the opening portion 62c in an outward movement.

The socket body 2, the mounting member 3, the cylindrical portion 20, the locking members 61 and 61, the operating sleeve 62, and the lock ring 65 mentioned above are made of a resin, however, they are not limited to this, so that they can be made of a stainless, a brass, a steel or the like. Further, the inner sleeve 63 is made of a stainless, however, can be made of a resin.

The spray apparatus 81 shown in the drawings is a spray can in which the nozzle 8 is projected from the front end surface of the spray end portion 80 positioned near the nozzle 8, a structure of injecting a fluid from a container portion by pressing the nozzle 8 inward is employed, and the flange 82 is provided inside the spray end portion 80. In this case, the spray apparatus 81 is structured such as to inject a fluid by pressing the nozzle 8 inward, and any structure can be employed as far as the flange portion is provided near the nozzle 8 in such a manner as to connect the mounting member 3.

A body 90 to be connected corresponding to a fluidic apparatus shown in the drawings is a pneumatic tool powered by a compressed air, so that the plug 9 is mounted in such a manner as to supply and inject the compressed air and the fluid discharged out from the spray apparatus 81. An outer peripheral groove 91 capable of engaging with the plate-shaped locking member 61 mentioned above and the locking member having a spherical shape and a roller pin shape is provided in the plug body 9 and an axial hole is extended therethrough. In this case, as the other examples of the connected body 90, a pneumatic driver, a pneumatic chisel, a pneumatic grinder, and a pneumatic sander, a pneumatic hammer, an impact wrench and the like can be exemplified. Further, in the case that the spray apparatus 81 is a spray can, the connected body 90 can be a fluid filling apparatus for filling a fluid within the spray can, and in this case, the plug body 9 can be connected to a terminal end of the fluid filling apparatus, for example, a terminal end of the hose.

In the case that the connected body 90 is the air tool mentioned above, a washing and lubricating agent, a washing agent, a lubricating agent, an anticorrosive agent and the like can be exemplified as the fluid, however, the fluid is not limited to this.

An operation of the coupling 1 mentioned above will be described below.

At first, as shown in FIG. 2, in order to connect the mounting member 3 to the spray end portion 80 of the spray apparatus 81, the locking projection portion 31 of the mounting member 3 and the flange portion 82 of the spray end portion 80 are engaged with each other by decreasing a diameter of the end portion having the slit 33 of the mounting member 3 in the state mentioned above (the state shown in FIG. 3) and fitting it into the spray end portion 80. At this time, the end portion having the slit 33 receives a force to a direction of expanding a diameter so as to be brought into contact with the flange portion 82 to bold it.

Next, as shown in FIG. 2, in order to connect the locking mechanism 6 and the plug body of the connected body 90, the front end of the plug body 9 is inserted into the opening end portion of the cylindrical portion 20, so that at first, the expanded diameter portion 92 of the plug body 9 is brought into contact with the taper surface of the inner sleeve 63, and when the plug body 9 is further inserted, the inner sleeve 63 inward moves against an elastic force of the spring 66 as the plug body 9 moves, thereby opening the long holes 61a and 61a of the cylindrical portion 20 closed by the inner sleeve 63 so that the locking members 61 and 61 can inward move. Then, the operating sleeve 62 stopped by the locking members 61 and 61 move by pressing by means of the spring 64 so as to inward move the locking members 61 and 61, to engage the locking members 61 and 61 with the outer peripheral groove 91 provided in the plug body 9, and further to restrict the locking members 61 and 61 buried in the cylinder portion 20 from projecting by the restricting surface 62a of the operating sleeve 62, so that the socket body 2 and the plug body 9 are connected. At this time, the front end of the plug body 9 is brought into contact with the annular elastic member 7, so that the socket body 2 and the plug body 9 are sealed therebetween in a liquid-tight manner. In this case, it is preferred that after the lock ring 65 is rotated and moved to the operating sleeve 62 against the elastic force of the spring 64, the shallow grooves 72, 72 of the two cam grooves 70, 70 formed on the inner surface of the lock ring 65 and the projections 65c, 65c formed on the cylindrical portion 20 are locked, so that the operating sleeve 62 can not return to the spray end. The plug body 9 is not simply come out by doing so, so that the plug body 9 is prevented from coming out due to an erroneous operation.

Then, as shown in FIG. 1, the fluid is injected into the connected body 90 from the spray apparatus 81 by pressing the nozzle 8. In order to achieve this, the spray apparatus 81 is pressed toward the connected body 90, the mounting member 3 and the socket body 2 mounted to the spray end portion 80 are relatively moved against the elastic force of the spring 4, the front end of the nozzle 8 is inserted into the outlet and inlet port 51 of the pressing portion 21b so as to press the taper surface of the fluid passage near the outlet and inlet port 51, thereby pressing the nozzle 8. At this time, since the front end of the nozzle 8 is press-contacted to the taper surface, a sealing performance with respect to the socket body 2 is improved, and the nozzle 8 is positioned within the fluid passage or axial bore 5 of the socket body 2, so that the fluid passage between the nozzle 8 and the socket body 2 is securely communicated. In the case that the spring 4 is not used, the mounting member 3 and the socket body 2 are relatively moved against the elastic force of the spring (not shown) provided for elastically forcing the nozzle 8 within the spray apparatus 81.

Further, at a time of separating the spray apparatus 81 from the connected body 90, in the case of locking the operating sleeve 62 by the lock ring 65, at first, after returning the lock ring 65 to an original position through reverse rotation thereof, the operating sleeve 62 is moved to the spray end against the elastic force due to the spring 64 so as to make the locking members 61 and 61 movable to an outer direction, thereby removing a connecting state between the outer peripheral groove 91 of the plug body 9 and the locking members 61 and 61. Then, the inner sleeve 63 is moved by the elastic force of the spring 66 so as to outward move the locking members 61 and 61 and pressing the plug body 9, and is brought into contact with the step portion 63a of the cylindrical portion 20 and stopped, thereby closing the long hole 61a of the cylindrical portion 20, so that the outward moving locking members 61 and 61 are restricted from inward moving. When the operating sleeve 62 moved against the spring 64 is removed, the restricting projection portion 62b of the operating sleeve 62 is brought into contact with the locking members 61 and 61 and then stopped. In this case, since the locking members 61 and 61 pressed out by the inner sleeve 63 is brought into contact with the inner peripheral surface of the opening portion 62c provided in the front end of the operating sleeve 62, it is not outward projected.

Since the coupling 1 mentioned above is structured such that the coupling 1 and the plug body 9 can be attached and detached in a state that the coupling 1 is connected to the spray end portion 80, the fluid can be injected only by replacing the connected body 90 by the other connected body. Accordingly, in the case that there are a multiplicity of connected body to be injected, the operating time can be widely reduced. Further, since the sealing performance between the nozzle 8 and the socket body 2, and between the socket body 2 and the plug body 9 is good, the fluid does not leak out and it is possible to recover the fluid within the spray apparatus 81 and to fill the fluid into the spray apparatus 81. Still further, since the socket body 2 and the mounting member 3 are elastically forced by the spring, the fluid injection can be stopped by removing the pressing of the spray apparatus 81.

In this case, the coupling in accordance with the present invention is not limited to the structure mentioned above, the structure may be made in the following manner.

It is not necessary to form the rear end portion of the socket body 2 in a double structure in order to form the outlet and inlet port 51 of the fluid passage. Further, it is not necessary to form the opening diameter of the outlet and inlet port of the fluid passage larger than the outer diameter of the nozzle 8, and it is sufficient that the opening diameter of the outlet and inlet port is larger than the opening diameter of the nozzle 8. Still further, in this case, since the front end of the nozzle 8 is brought into contact with the periphery of the outlet and inlet port, it is not necessary to form the portion near the outlet and inlet port of the fluid passage in a taper shape in order to press the nozzle 8.

The mounting member 3 is structured such that the locking projection portion 31 is provided in the outer end portion of the front end close to the spray end in a projecting manner in order to be fitted into the inner end of the spray end portion 80, the structure can be made such that the locking projection portion is provided in the inner end portion in a projecting manner so as to be fitted into the outer end of the spray end portion. Further, the structure can be made such that the other fitting means is independently employed in place that a plurality of slits 33 is provided in the front end portion close to the spray of the mounting member 3 so as to be fitted to the spray end portion 80.

The locking mechanism 6 is structured such that a pair of opposing plate-shaped locking members 61 and 61 are provided at a position of the diameter of the cylindrical portion 20 in such a manner as to freely project and sink, however, the structure can be made such that a plurality of taper holes are pierced along the circumferential direction of the cylindrical portion and a spherical locking ball is provided in the hole in such a manner as to freely project and sink. Further, a roll pin can be employed for the locking member. In this case, as well as the long hole inserting the roll pin is extended through from the outer peripheral surface of the cylindrical portion 20 to the inner peripheral surface, the long hole is formed in a V shape. In this case, it is not necessary to provide the inner sleeve 63.

The lock ring 65 is hooked to the operating sleeve 62 end by locking the projection 65c provided in the cylindrical portion 20 with the shallow groove 72 of the cam groove 70 constituted by the deep groove 71 and the shallow groove 72 provided in the inner peripheral surface of the lock ring 65, thereby restricting the operating sleeve 62 from moving, however, the structure can be made such that as well as a thread is formed on the inner peripheral surface of the lock ring, the corresponding thread meshing therewith is formed on the outer peripheral surface of the cylindrical portion 20, thereby hooking the lock ring 65 with the operating sleeve 62 end. Further, in place of this, the structure can be made such that the locking projection portion is provided in the outer periphery of the cylindrical portion in a projecting manner, a slit groove engaging with the lock ring is provided, and the locking projection portion is locked with the end surface of the lock ring, thereby hooking the lock ring with the operating sleeve end.

When the structure is made such that a plug end contacting portion (not shown) of the mounting member 3 is brought into contact with the rear end portion of the lock ring 65, since the socket body 2 and the mounting member 3 can not be relatively moved till the plug body 9 is connected to the socket body 2 and the lock ring 6 is moved to the operating sleeve 62 end, the case that the nozzle 8 is erroneously pressed in a state that the plug body is not connected, thereby erroneously injecting the fluid is not occurred. In this case, it is possible to provide a contact portion for restricting the mounting member 3 from moving independently from the lock ring 65.

Further, not illustrated, however, the structure can be made such that the socket body 2 and the plug body 9 are provided in the reverted manner, that is, the mounting member 3 is slidably mounted to the rear end portion of the plug body and the socket body having the locking mechanism is mounted to the connected member 90.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalent.

I claim:

1. A coupling for detachably connecting a plug body, being provided on a fluidic apparatus in order to connect the fluidic apparatus to a fluid tube, and having an outer peripheral groove and an axial hole, with a spray apparatus which includes a container portion for receiving a fluid, a nozzle having a front end portion projecting from the container portion and being urged toward the front end portion, a normally closed valve disposed in an open position for opening an inner portion of the container portion, and any fluid contained therein, to an outer environment through the nozzle when the nozzle is pressed toward the container portion, and a spray end portion projecting from the container portion adjacent said nozzle, the coupling comprising:

a socket body having a first end portion, a second end portion and an axial hole open in the first and second end portions;

a releasable locking mechanism provided in the first end portion of said socket body, for lockingly engaging through the groove of said plug body and communicating the axial hole in the socket body with the axial hole in the plug body;

a mounting member attached to the second end portion of said socket body in such a manner as to freely slide to an axial direction, said mounting member having a front end portion which projects in the axial direction from the second end portion of the socket body and engages with the spray end portion of said spray apparatus so as to attach the socket body to the spray apparatus in a removable manner; and a pressing portion axially projecting from the second end portion of the socket body, said pressing portion being brought into contact with the front end portion of said nozzle when the spray apparatus is axially pressed toward the second end portion of the socket body, thereby pressing the nozzle to the container portion end of the spray apparatus.

2. A coupling according to claim 1, further comprising a spring attached to the second end portion of said socket body and urging said mounting member to the front end portion.

3. A coupling according to claim 1, wherein said mounting member has at least one axially extending slit having substantially a cylindrical shape and capable of elastically changing a diameter of the front end portion and a locking projection portion projecting radially from the front end portion so as to be locked in the spray end portion of said spray apparatus.

4. A coupling according to claim 1, wherein said pressing portion is provided with an outlet and inlet port communicating with said axial hole and having a circular cone surface, and the circular cone surface in the outlet and inlet port can be sealed and engaged with the front end portion of said nozzle in a fluid sealing manner.

5. A coupling according to claim 1, wherein said socket body has a guide portion axially projecting from the second end portion and axially guiding the mounting member, and a stopper formed in the front end portion of the guide portion and locking the mounting member urged by the spring.

6. A coupling according to claim 5, wherein said stopper is disposed at a position in which the nozzle of the spray apparatus and the pressing portion are separated and the mounting member urged by the spring is locked.

7. A coupling according to claim 1, further comprising a seal member disposed within the socket body and sealing between the plug body and the socket body in a fluid sealing manner.

8. A coupling according to claim 1, wherein said socket body comprises a cylindrical portion at the first end portion thereof, and said locking mechanism has at least one long hole formed in the cylindrical portion, at least one locking member capable of moving in the radial direction of the cylindrical portion through the long hole, and an operation sleeve attached on the cylindrical portion in such a manner as to axially move and preventing the locking member from moving outward in the radial direction when the locking member moves inward in the radial direction, and the inner end portion of the locking member in the radial direction can be fitted into the outer peripheral groove of the plug body.

9. A coupling according to claim 8, wherein said locking mechanism is attached on said cylindrical portion and has a lock ring preventing the operating sleeve from moving from a position preventing a movement of the locking member outward in the radial direction.

10. A coupling according to claim 8, wherein said locking mechanism is provided with an inner sleeve slidably disposed within the cylindrical portion, and the inner sleeve is disposed at a position in which the inner end portion of said locking member in the radial direction is prevented from projecting within the cylindrical member when the coupling is not attached to the plug body and can be moved from the position by the plug body.

11. A coupling according to claim 10, wherein said operating sleeve and the inner sleeve are urged toward the direction apart from the second end portion of the socket body.

12. A coupling according to claim 8, wherein said cylindrical portion is integrally formed with the socket body.

* * * * *